Aug. 10, 1943.     D. E. ELMENDORF ET AL     2,326,344
APPARATUS FOR DETECTING VARIATIONS IN WIRE-LIKE BODIES
Filed June 25, 1941
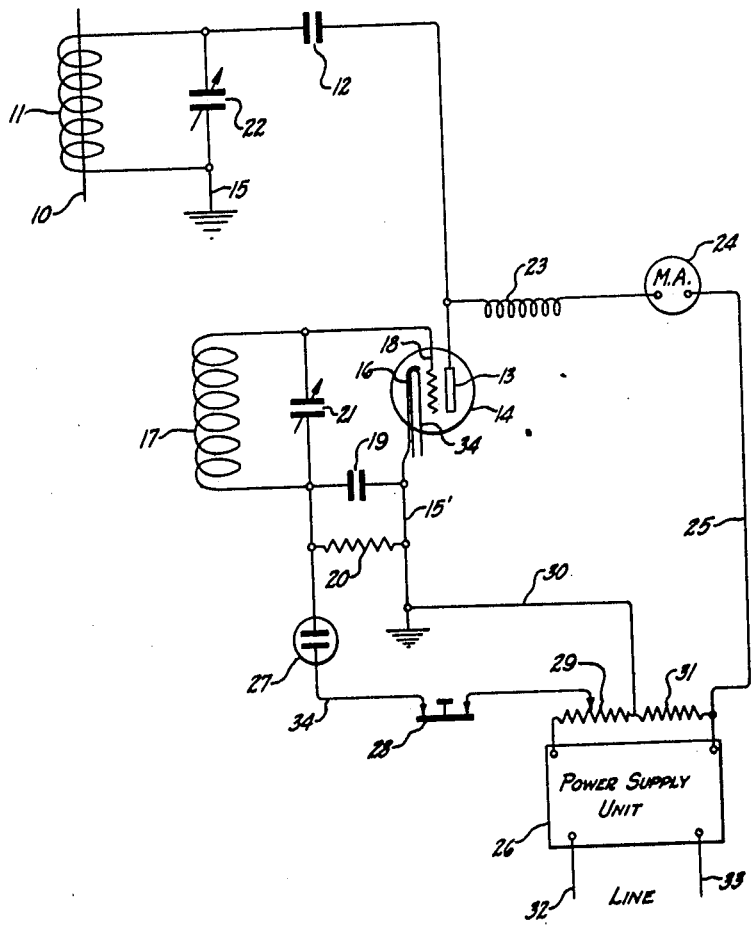
Inventor:
Duryea E. Elmendorf,
Karl H. Keller,
by John H. Anderson
Their Attorney.

Patented Aug. 10, 1943

2,326,344

UNITED STATES PATENT OFFICE 2,326,344

APPARATUS FOR DETECTING VARIATIONS IN WIRELIKE BODIES

Duryea E. Elmendorf, Cleveland, and Karl H. Keller, Cleveland Heights, Ohio, assignors to General Electric Company, a corporation of New York Application June 25, 1941, Serial No. 399,646

7 Claims. (Cl. 177—311)

Our invention relates to apparatus for detecting defects and variations in wire, rod and the like.

An object of our invention is to provide apparatus of a particularly sensitive nature for testing wire and wire-like bodies for variations which may be so minute or within the interior parts of the wire-like bodies as not to be readily discoverable upon observation. The sensitivity of the apparatus must be such that the wire-like bodies can be tested at a very rapid rate so as to keep the cost of said operation to a minimum and allow the use of said apparatus with other high speed apparatus for treating said bodies.

Another object of our invention is to provide automatic apparatus for detecting variations in wire-like bodies such that the need for manual attention to said apparatus is limited to periods when it discovers a variation or defect in the wire-like body. The preferred embodiment of our invention indicates its discovery of the variation by causing a neon glow lamp to become lighted.

Another object of our invention is to provide reliable low cost apparatus for detecting defects in wire-like bodies. Still other objects and advantages of our invention will appear on inspection of the following detailed description of the species thereof shown in the drawing.

One use of our apparatus is in the inspection of seal wires for electric lamps, radio tubes and other similarly constructed devices. Such wires are generally composite wires having a nickel-iron core within a copper sheath or are made of tungsten so that they may be sealed into the vitreous envelope of said devices and will retain a gas-tight joint therewith at all temperatures. Very careful and detailed inspection of such wire is required in that very minute fissures, longitudinal cracks, or other flaws, are apt to prevent the proper sealing of the wires to the envelope and provide small passage-ways through the seal which cause small leaks into said devices. Flaws of the latter type can occur in tungsten wires as they are formed of longitudinal crystals and in the other type wires, which are generally referred to as Dumet wire, because of their composite nature.

The drawing is a wiring diagram of one species of apparatus comprising our invention.

In the device diagrammatically shown in the drawing, the wire 10 is the body being tested by our apparatus and it is moving at the rapid rate of 40 feet per minute through the open center of the exploring coil 11 thereof. The wire 10 is a so-called Dumet wire of .008 inch in diameter and is moved by means (not shown) located beyond the field of the exploring coil 11 which means can, if desired, be part of apparatus for manufacturing the wire 10. The exploring coil 11 is connected through the condenser 12 to the plate or anode 13 of the vacuum tube 14 and through the ground and leads 15 and 15' to the cathode 16 of said tube 14 which together can be regarded as the working circuit of the apparatus. The reactive coupling between the wire 10 and the exploring coil 11 is such that variations in the wire 10 produce corresponding variations in the work circuit and is such that considerably larger or smaller wires can be tested and much higher wire speeds (200 feet per minute) can be used if desired.

The test apparatus also provides a second major circuit comprised of the inductance 17 which is connected to the control grid 18 of the vacuum tube 14, and the condenser 19 and high resistance 20 which are connected in parallel between the opposite end of the inductance 17 and the cathode 16 of said vacuum tube 14. The possible frequency of oscillation of the reference circuit is under the control of the variable condenser 21 which is connected across the inductance 17.

The other parts of the apparatus include the variable condenser 22 which is connected across the exploring coil 11 and which allows the work circuit to be adjusted; the choke coil 23 and the milliammeter 24 which are connected in a lead 25 joining the plate or anode 13 of the vacuum tube 14 and the highest voltage tap on the power supply 26, and the neon glow lamp 27 and push button switch 28 which are connected in a lead joining one end of the inductance 17 and the variable element of the resistance 29 which is, in turn, connected to the negative tap on the power supply 26. The cathode 16 of the vacuum tube 14 is connected to the ground and through lead 30 to the lead joining the resistances 29 and 31 which are connected to the opposite voltage taps of the power supply unit and which cause said cathode 16 to have an intermediate potential. The above apparatus forms a specially constructed electrical oscillation generator having its only source of energy in the power supply 26 which is connected to the line through the connections 32 and 33 and which transforms the alternating current of said line to direct current of the desired voltage in the usual manner. Means can also be provided in the power supply to provide electrical currents of the proper voltage for the heater element 34 of the vacuum tube 14 if desired.

Before the apparatus can be used it must be adjusted to suit the particular wire being inspected, since different wires have different reactive effect on the field of the coil 11. Normally it is most convenient to draw a short section of the wire 10 to be inspected by the apparatus into the coil 11 and to adjust condenser 22 to compensate for variations in the work circuit caused by said wire 10 and then to adjust condenser 21 to establish conditions within the apparatus whereby slight changes in the reactive effect produced by changes in the wire 10 will be sufficient to cause said apparatus to stop oscillating. The adjustment of condenser 22 is a comparatively simple operation and only requires that the condenser 22 be turned to one or another of several positions which, from prior experience are known to tune the apparatus properly. The adjustment of condenser 21 on the other hand can not be made until the switch 28 is depressed so as to disconnect the lamp 27 from the apparatus and requires that the condenser 21 first be varied until it is found impossible to increase the current indicated by the milliammeter 24, and second, be revaried to a point beyond which it can not be adjusted without causing a particularly sharp drop in the current indicated by the milliammeter 24. The apparatus is then in oscillation but is in such a condition that any change in the wire 10 within the coil 11 of the work circuit will cause it to stop oscillating and cause a sharp drop in the current indicated by the milliammeter 24. If it is desired, the adjustment of the apparatus can be tested by drawing a section of the wire 10 which is scratched, or is known to be imperfect, into the coil 11.

During the above adjustments, the switch 28 is kept open so that the conditions within the apparatus are entirely dependent on the adjustment of said apparatus and the reactive effect of the wire 10. It is, however, advisable to test the operation of the lamp 27 to make sure it will glow when the apparatus stops oscillating and a defective section of the wire 10 passes into the coil 11. The test is made by releasing the switch 28 when a perfect section of wire 10 is within the coil 11 as the apparatus will then be in oscillation and the voltage across the lamp 27 will not be great enough to cause it to glow. An imperfect section of the wire 10 is then drawn into the coil to cause the apparatus to stop oscillating and the lamp 27 to glow. If the lamp 27 does not operate in the above manner, the voltage applied to it is incorrect and should be changed by varying the connection made to the resistance 29. Once the lamp 27 is caused to glow it will receive sufficient voltage to cause it to continue to operate even if a perfect section of wire 10 is drawn into the coil 11 and the switch 28 must be opened momentarily to disconnect it from the apparatus so that both will again operate in desired manner. If the section of wire 10 located in the exploring coil 11 during the period of adjustment is the forward end of the wire to be tested, the means for advancing said wire through said coil can now be started, but should it be separate therefrom, the sample wire will have to be replaced by the wire 10 to be tested and the push button switch 28 will again have to be pushed to extinguish the glow lamp 27.

The indicated current on the milliammeter 24 remains steady and the glow lamp 27 remains unlighted while the wire 10 passes through the exploring coil 11, if the condition of said wire 10 does not change, but should a flaw or other change appear in said wire 10 which would change the reactance of the exploring circuit, the apparatus will stop oscillating, and the indicated current will become less and the glow lamp 27 will light. The glow lamp 27 is caused to light up by the reduction in the voltage drop across the resistance 20 which, being of the same polarity as the potential existing between leads 30 and 34 balances out the effective potential across the neon lamp 27 so that when there are strong oscillations, there is a high drop across resistance 20 and the voltage across lamp 27 is very low. Lamp 27 continues to glow until the push button switch 28 is pressed even though the imperfect section of wire passes from the exploring coil 11 and the indicated current increases immediately to normal. Lamp 27 continues to glow until its circuit is broken because its operating voltage is less than its starting voltage, and because of the polarity of leads 30 and 34, a negative voltage is impressed upon the grid 18 of the tube 14, which prevents the apparatus from oscillating.

The above-described action of the apparatus is very desirable since it permits the wire 10 to be passed through the exploring coil 11 at a much higher speed than other apparatus will permit as the neon lamp 27 is sensitive to voltage changes caused by flaws which have little or no effect on the milliammeter 24 at comparable speeds. The ability of the glow lamp to stay lighted is also an advantage as a single operator can then care for a number of such testing apparatus since the test apparatus does not require the constant attention of said operator. If the test apparatus does not receive attention immediately after the glow lamp becomes lighted, little damage is done as the section of the wire 10 having the flaw therein can be discovered by the operator by extinguishing the lamp and running the wire 10 backward through the exploring coil 11 until said lamp 27 is again lighted and the current indicated by the milliammeter 24 decreases. The sensitivity of the apparatus depends on the adjustment of the condenser 21 because it can be brought within various degrees of the point where the apparatus stops oscillating.

What we claim as new and desire to secure by Letters Patent of the United States is:

1. Apparatus for detecting flaws in wire-like bodies comprising an oscillator having a vacuum tube with a cathode, anode and control grid, a resistance connected at one end to the control grid through an inductance, means for connecting the positive terminal of a source of electrical energy to the anode and the negative terminal of said source to the cathode and the other end of the resistance, and a tuned work circuit comprising a coiled reactance connected between the cathode and the anode adapted to allow the wire-like body to pass through it and cause the apparatus to oscillate electrically when the wire-like body has definite characteristics and prevent oscillations when said wire-like body has other characteristics, and indicating means connected across the resistance and actuated due to the reduced voltage drop across the resistance when the apparatus is not oscillating.

2. Apparatus for detecting flaws in wire-like bodies comprising an oscillator having a vacuum tube with a cathode, anode and control grid, a resistance connected at one end to the control grid through an inductance, means for connecting the positive terminal of a source of electrical energy to the anode and the negative terminal of said source to the cathode and the other end of the resistance, and a tuned work circuit comprising a condenser and a coiled reactance connected in series between the cathode and the anode, the reactance adapted to allow the wire-like body to pass through it and cause the apparatus to oscillate electrically when the wire-like body has definite characteristics and prevent oscillations when said wire-like body has other characteristics, and indicating means connected across the resistance and actuated due to the reduced voltage drop across the resistance when the apparatus is not oscillating.

3. Apparatus for detecting flaws in wire-like bodies comprising an oscillator having a vacuum tube with a cathode, anode and control grid, a resistance connected at one end to the control grid through an inductance, means for connecting the positive terminal of a source of electrical energy to the anode and the negative terminal of said source to the cathode and the other end of the resistance, and a work circuit comprising a coiled reactance connected between the cathode and the anode adapted to allow the wire-like body to pass through it and means of tuning the work circuit to a point where the apparatus oscillates electrically when the wire-like body has definite characteristics and stops oscillating when said wire-like body has other characteristics, and indicating means connected across the resistance and actuated due to the reduced voltage drop across the resistance when the apparatus is not oscillating.

4. Apparatus for detecting flaws in wire-like bodies comprising an oscillator having a vacuum tube with a cathode, anode and control grid, a resistance connected at one end to the control grid, means for connecting the positive terminal of a source of electrical energy to the anode and the negative terminal of said source to the cathode and the other end of the resistance, and a tuned work circuit comprising a coiled reactance connected between the cathode and the anode adapted to allow the wire-like body to pass through it and means connected in series with the resistance and grid for adjusting the apparatus to a point where the apparatus oscillates electrically when the wire-like body has definite characteristics and stops oscillatiing when said wire-like body has other characteristics, and indicating means connected across the resistance and actuated due to the reduced voltage drop across the resistance when the apparatus is not oscillating.

5. Apparatus for detecting flaws in wire-like bodies comprising an oscillator having a vacuum tube with a cathode, anode and control grid, a resistance connected at one end to the control grid through an inductance, means for connecting the positive terminal of a source of electrical energy to the anode and the negative terminal of said source to the cathode and the other end of the resistance, and a tuned work circuit comprising a coiled reactance connected between the cathode and the anode adapted to allow the wire-like body to pass through it and cause the apparatus to oscillate electrically when the wire-like body has definite characteristics and prevent oscillations when said wire-like body has other characteristics, and a discharge lamp connected across the resistance and caused to operate due to the reduced voltage drop across the resistance when the apparatus is not oscillating.

6. Apparatus for detecting flaws in wire-like bodies comprising an oscillator having a vacuum tube with a cathode, anode and control grid, a resistance connected at one end to the control grid, means for connecting the positive terminal of a source of electrical energy to the anode and the negative terminal of said source to the cathode and the other end of the resistance, and a work circuit comprising a condenser and a coiled reactance connected in series between the cathode and the anode, the reactance adapted to allow the wire-like body to pass through it and means of tuning the work circuit to a point where the apparatus oscillates electrically when the wire-like body has definite characteristics, and means connected in series with the resistance and grid for adjusting the apparatus to a point where oscillations stop when said wire-like body has other characteristics, and a discharge lamp connected across the resistance and caused to operate due to the reduced voltage drop across the resistance when the apparatus is not oscillating.

7. Apparatus for detecting flaws in moving wire comprising a vacuum tube having a cathode, grid and anode, a working circuit comprising an inductance coil through which the wire moves, said coil being connected across the cathode and anode of said tube, means for tuning said working circuit, a reference circuit comprising a grid inductance connected at one end to the grid of said tube, a resistance connected between the other end of said grid inductance and the cathode of said tube, means for tuning said reference circuit, a source of electrical energy having its positive terminal connected to said anode and its negative terminal connected to the cathode and the adjacent end of said resistance, a gaseous glow lamp and a normally closed switch connected in series between the junction of the resistance and grid inductance and a source of potential more negative than the said cathode, a change in inductance in said working circuit causing a reduction in the voltage drop across the said resistance and a resultant ignition of said glow lamp.

DURYEA E. ELMENDORF.
KARL H. KELLER.